(12) United States Patent
Berthold et al.

(10) Patent No.: US 7,427,649 B2
(45) Date of Patent: Sep. 23, 2008

(54) POLYETHYLENE BLOW MOLDING COMPOSITION FOR PRODUCING SMALL CONTAINERS

(75) Inventors: Joachim Berthold, Kelkheim (DE); Ludwig Böhm, Hattersheim (DE); Peter Krümpel, Bad Camberg (DE); Rainer Mantel, Worms (DE)

(73) Assignee: Basell Polyolefine GmbH, Wesseling (DE)

( * ) Notice: Subject to any disclaimer, the term of this patent is extended or adjusted under 35 U.S.C. 154(b) by 245 days.

(21) Appl. No.: 10/537,728

(22) PCT Filed: Dec. 6, 2003

(86) PCT No.: PCT/EP03/13868

§ 371 (c)(1),
(2), (4) Date: Jun. 7, 2005

(87) PCT Pub. No.: WO2004/156921

PCT Pub. Date: Jul. 8, 2004

(65) Prior Publication Data

US 2006/0155058 A1 Jul. 13, 2006

Related U.S. Application Data

(60) Provisional application No. 60/444,596, filed on Feb. 3, 2003.

(30) Foreign Application Priority Data

Dec. 19, 2002 (DE) ............... 102 59 491
Jun. 4, 2003 (DE) ............... 103 25 483

(51) Int. Cl.
*C08F 10/02* (2006.01)
*C08L 23/08* (2006.01)

(52) U.S. Cl. ............... 525/53; 525/193; 525/240

(58) Field of Classification Search ............... 525/53, 525/193, 240
See application file for complete search history.

(56) References Cited

U.S. PATENT DOCUMENTS

| | | | |
|---|---|---|---|
| 4,336,352 A * | 6/1982 | Sakurai et al. ............... 525/240 |
| 4,447,587 A | 5/1984 | Berthold et al. | |
| 4,536,550 A * | 8/1985 | Moriguchi et al. ........... 525/240 |
| 5,338,589 A | 8/1994 | Böhm et al. ............... 428/36.9 |
| 5,350,807 A | 9/1994 | Pettijohn et al. | |
| 5,422,400 A | 6/1995 | Kamiyama et al. | |
| 5,648,309 A | 7/1997 | Böhm ............... 502/105 |
| 5,882,750 A | 3/1999 | Mink et al. | |
| 6,136,924 A | 10/2000 | Promel | |
| 6,242,548 B1 | 6/2001 | Duchesne et al. ........... 526/255 |
| 6,329,054 B1 | 12/2001 | Rogestedt et al. | |
| 6,344,522 B1 | 2/2002 | Promel ............... 525/242 |
| 6,407,185 B1 | 6/2002 | Promel | |
| 6,713,561 B1 | 3/2004 | Berthold et al. ............... 525/91 |
| 2003/0149180 A1 | 8/2003 | Van Dun et al. | |
| 2006/0052542 A1 | 3/2006 | Berthold et al. | |
| 2006/0074193 A1 | 4/2006 | Berthold et al. | |
| 2006/0074194 A1 | 4/2006 | Berthold et al. | |
| 2006/0155058 A1 | 7/2006 | Berthold et al. | |

FOREIGN PATENT DOCUMENTS

| | | | |
|---|---|---|---|
| DE | 19945980 | * | 3/2001 |
| DE | 102 59 491 | | 7/2004 |
| EP | 0 129 312 | | 12/1984 |
| EP | 0 068 257 | | 4/1985 |
| EP | 0 401 776 | | 12/1990 |
| EP | 0 492 656 | | 7/1992 |
| EP | 0 532 551 | | 3/1993 |
| EP | 0603935 | | 6/1994 |
| EP | 0 797 599 | | 10/1997 |
| EP | 0 905 151 | | 3/1999 |
| EP | 1 266 738 | | 3/2003 |
| GB | 2 056 996 | | 3/1981 |
| WO | 9118934 | | 12/1991 |
| WO | 97/03124 | | 1/1997 |
| WO | 97/03139 | | 1/1997 |
| WO | 01/23446 | | 4/2001 |
| WO | 2004/056921 | | 7/2004 |
| WO | 2004/058876 | | 7/2004 |
| WO | 2004/058877 | | 7/2004 |
| WO | 2004/058878 | | 7/2004 |
| WO | 2006/053740 | | 7/2004 |
| WO | 2006/053741 | | 5/2006 |

OTHER PUBLICATIONS

M. Fleißner, "Langsames Rißwachstum und Zeitstandfestigkeit von Rohren aus Polyethylen," *Kunststoffe Hoechst*, vol. 77, p. 45-50 (1987) (including English language translation of text).

* cited by examiner

*Primary Examiner*—Roberto Rábago
(74) *Attorney, Agent, or Firm*—William R. Reid

(57) ABSTRACT

The invention relates to a polyethylene composition with multi-modal molecular mass distribution, which is particularly suitable for blow molding of small containers with a volume in the range of from 200 to 5000 cm$^3$ (=ml). The composition has a density in the range of from 0.955 to 0.960 g/cm$^3$ at 23° C. and an MFR$_{190/5}$ in the range from 0.8 to 1.6 dg/min. It composition from 45 to 55% by weight of a low-molecular-mass ethylene homopolymer A, from 20 to 35% by weight of a high-molecular-mass copolymer B made from ethylene and from another 1-olefin having from 4 to 8 carbon atoms, and from 20 to 30% by weight of an ultrahigh-molecular-mass ethylene copolymer C.

10 Claims, No Drawings

POLYETHYLENE BLOW MOLDING COMPOSITION FOR PRODUCING SMALL CONTAINERS

This application is the U.S. national phase of International Application PCT/EP2003/013868, filed Dec. 6, 2003, claiming priority to German Patent Application numbers 10259491.0, filed Dec. 19, 2002, and 10325483.8, filed Jun. 4, 2003, and the benefit under 35 U.S.C. 119(e) of U.S. Provisional Application No. 60/444,596, filed Feb. 3, 2003; the disclosures of International Application PCT/EP2003/013868, German Patent Application numbers 10259491.0 and 10325483.8, and U.S. Provisional Application No. 60/444,596, each as filed, are incorporated herein by reference.

The present invention relates to a polyethylene composition with multimodal molecular mass distribution, which is particularly suitable for blow molding of small blow moldings such as containers with a capacity or volume in the range of from 200 to 5000 cm$^3$ (=ml), and to a process for preparing this polyethylene composition in the presence of a catalytic system composed of a Ziegler catalyst and a co-catalyst, by way of a multistage process composed of successive slurry polymerizations. The invention further relates to the small blow moldings produced from the polymer composition by blow molding.

Polyethylene is widely used for producing blow moldings of all sizes requiring a material with particularly high mechanical strength and high stress crack resistance. Another particular advantage of polyethylene is that it also has good chemical resistance and is intrinsically a light-weight material.

EP-A-603,935 has previously described a blow molding composition based on polyethylene and having a bimodal molecular mass distribution, and suitable for the production of moldings with good mechanical properties.

U.S. Pat. No. 5,338,589 describes a material with even broader molecular mass distribution, prepared using a high-mileage catalyst known from WO 91/18934, in which the magnesium alcoholate is used in the form of a gel-like suspension. Surprisingly, it has been found that the use of this material in moldings, in particular in pipes, permits simultaneous improvement in properties which are usually contrary correlated in semicrystalline thermoplastics, these being stiffness on the one hand and stress-crack resistance and toughness on the other hand.

However, the known bimodal products in particular have relatively low melt strength during processing. This means that the extruded parison frequently break in the molten state, making the extrusion process unacceptably sensitive to processing. In addition, especially when thick-walled containers are being produced, the wall thickness is found to be non-uniform, due to flow of the melt from upper regions into lower regions of the mold.

It is an objective of the present invention, therefore, to develop a polyethylene composition for blow molding which shows a further improvement over all of the known materials in processing by blow molding to produce small blow moldings. In particular, the high melt strength of the composition should permit to run an extrusion process without parison disruption over a long time period, and the precisely adjusted swell ratio of the composition should permit an optimization of wall-thickness control.

We have surprisingly found that this objection is achieved by way of a composition as mentioned at the outset, the characterizing features of which are that it comprises from 45 to 55% by weight of a low-molecular-mass ethylene homopolymer A, from 20 to 35% by mass of a high-molecular-mass copolymer B made from ethylene and from another 1-olefin having from 4 to 8 carbon atoms, and from 20 to 30% by weight of an ultrahigh-molecular-mass ethylene copolymer C, wherein all of the percentage data are based on the total weight of the molding composition.

The invention also relates to a process for preparing this composition in a cascaded slurry polymerization process and to a process for producing small blow moldings such as containers with a capacity (=volume) in the range of from 200 to 5000 cm$^3$ (=ml) and with quite excellent mechanical strength properties.

The polyethylene composition of the invention has a density in the range of from 0.955 to 0.960 g/cm$^3$ at 23° C., and a broad trimodal molecular mass distribution. The high-molecular-mass copolymer B contains only small proportions of other 1-olefin monomer units having from 4 to 8 carbon atoms, namely from 0.1 to 0.6% by weight. Examples of these co-monomers are 1-butene, 1-pentene, 1-hexene, 1-octene, or 4-methyl-1-pentene. The ultrahigh-molecular-mass ethylene copolymer C also contains an amount of 1-olefins in the range of from 0.5 to 2.5% by weight of one or more of the above-mentioned co-monomers.

The pelletized polymer composition of the invention has a melt flow index (ISO 1133) in the range from 0.8 to 1.6 dg/min, expressed in terms of $MFI_{190/5}$, and a viscosity number $VN_{tot}$ in the range from 280 to 350 cm$^3$/g, measured according to ISO/R 1191 in decalin at 135° C.

The trimodality is a measure of the position of the centers of gravity of the three individual molecular mass distributions, and can be described with the aid of the viscosity number VN to ISO/R 1191 of the polymers formed in the successive polymerization stages. The relevant band widths for the polymers formed in each of the stages of the reaction are therefore as follows:

The viscosity number $VN_1$ measured on the polymer after the first polymerization stage is identical with the viscosity number $VN_A$ of the low-molecular-mass polyethylene A and according to the invention is in the range of from 70 to 90 cm$^3$/g.

The viscosity number $VN_2$ measured on the polymer after the second polymerization stage is not equal to $VN_B$ of the high-molecular-mass polyethylene B formed in the second polymerization stage, which can only be determined by calculation, but rather represents the viscosity number of the mixture of polymer A and polymer B. According to the invention, $VN_2$ is in the range of from 150 to 200 cm$^3$/g.

The viscosity number $VN_3$ measured on the polymer after the third polymerization stage is not equal to $VN_C$ of the ultra-high-molecular-mass copolymer C formed in the third polymerization stage, which can only be determined by calculation, but rather represents the viscosity number of the mixture of polymer A, polymer B, and polymer C. According to the invention, $VN_3$ is in the range of from 260 to 340 cm$^3$/g.

The polyethylene is obtained by polymerizing the monomers in slurry in the range from 70 to 90° C., preferably from 80 to 90° C., at a pressure in the range from 0.15 to 1 MPa, and in the presence of a high-mileage Ziegler catalyst composed of a transition metal compound and of an organoaluminum compound such as triethylaluminum, triisobutylaluminum, alkylaluminum-chlorides or alkylaluminumhydrides. The polymerization is conducted in three stages, i.e. in three stages arranged in series, each molecular mass being regulated thereby with the aid of a hydrogen feed.

The polyethylene composition of the invention may comprise other additives alongside the polyethylene. Examples of these additives are heat stabilizers, antioxidants, UV absorbers, light stabilizers, metal deactivators, compounds which destroy peroxide, and basic costabilizers in amounts of from 0 to 10% by weight, preferably from 0 to 5% by weight, and also fillers, reinforcing agents, plasticizers, lubricants, emulsifiers, pigments, optical brighteners, flame retardants, antistatics, blowing agents, or a combination of these, in total amounts of from 0 to 50% by weight, based on the total weight of the mixture.

The composition of the invention is particularly suitable for the blow molding process to produce small blow moldings, by first plastifying the polyethylene composition in an extruder in the range of from 200 to 250° C. and then extruding it through a die into a mold, where it is cooled and solidified thereby.

The composition of the invention gives particularly good processing behavior in the blow molding process to produce small blow moldings because it has a swell ratio in the range of from 115 to 145%, and the small blow moldings produced therewith have particularly high mechanical strength because the molding composition of the invention has a notched impact strength (ISO) in the range of from 8 to 14 kJ/m$^2$. Its stress-crack resistance (FNCT) is in the range from 8 to 20 h.

The notched impact strength$_{ISO}$ is measured according to ISO 179-1/1eA/DIN 53453 at 23° C. The size of the specimen is 10×4×80 mm, and a V notch is inserted using an angle of 45°, with a depth of 2 mm and with a notch base radius of 0.25 mm.

The stress-crack resistance of the molding composition of the invention is determined by an internal test method and is given in h. This laboratory method is described by M. Fleiβner in Kunststoffe 77 (1987), pp. 45 et seq., and corresponds to ISO/FDIS 16770, which has since come into force. In ethylene glycol as stress-crack-promoting medium at 80° C. with a tensile stress of 3.5 MPa, the time to failure is shortened due to the shortening of the stress-initiation time by the notch (1.6 mm/razorblade). The specimens are produced by sawing out three specimens of dimensions 10×10×90 mm from a pressed plaque of thickness 10 mm. These specimens are provided with a central notch, using a razorblade in a notching device specifically manufactured for the purpose (see FIG. 5 in the publication). The notch depth is 1.6 mm.

EXAMPLE 1

Ethylene was polymerized in a continuous process in three reactors arranged in series. An amount of 13.5 mmol/h related to the titanium compound of a Ziegler catalyst prepared as specified in WO 91/18934, Example 2, and having the operative number 2.2 in the WO, was fed into the first reactor together with 174 mmol/h of triethylaluminum, as well as sufficient amounts of diluent (hexane), ethylene, and hydrogen. The amount of ethylene (=67.2 kg/h) and the amount of hydrogen (=74 g/h) were adjusted so that the percentage proportion of ethylene and of hydrogen measured in the gas space of the first reactor were from 20 to 23% by volume and 66 to 71% by volume, respectively, and the rest was a mix of nitrogen and vaporized diluent.

The polymerization in the first reactor was carried out at 84° C.

The slurry from the first reactor was then transferred into a second reactor, in which the percentage proportion of hydrogen in the gas phase had been reduced to 16 to 20% by volume, and an amount of 120 g/h of 1-butene was added to this reactor alongside with 46.8 kg/h of ethylene. The amount of hydrogen was reduced by way of intermediate H$_2$ depresurization. 65 to 70% by volume of ethylene, 16 to 20% by volume of hydrogen, and 0.15 to 0.20% by volume of 1-butene were measured in the gas phase of the second reactor, the rest being a mix of nitrogen and vaporized diluent.

The polymerization in the second reactor was carried out at 84° C.

The slurry from the second reactor was transferred to the third reactor using further intermediate H$_2$ depressurization to adjust the amount of hydrogen to 2.0% by volume in the gas space of the third reactor.

An amount of 540 g/h of 1-butene was added to the third reactor alongside with an amount of 32.1 kg/h of ethylene. A percentage proportion of 81 to 84% by volume of ethylene, 1.9 to 2.3% by volume of hydrogen, and 1.2% by volume of 1-butene was measured in the gas phase of the third reactor, the rest being a mix of nitrogen and vaporized diluent.

The polymerization in the third reactor was carried out at 84° C.

The long-term polymerization catalyst activity required for the cascaded process described above was provided by a specifically developed Ziegler catalyst as described in the WO 91/18934 mentioned at the outset. A measure of the usefulness of this catalyst is its extremely high hydrogen sensitivity and its uniformly high activity over a long time period of between 1 to 8 h.

The diluent is removed from the polymer slurry leaving the third reactor, and the polymer is dried and then pelletized at a temperature between 220 to 250° C. under specific energy consumption 0.2 to 0.3 kW/h/kg. The polymer powder is stabilized with 0.1% by weight Ca-stearate, 0.08% by weight Irganox 1010 and 0.16% by weight Irgafos 168.

Table 1 shown below gives the viscosity numbers and quantitative proportions $W_A$, $W_B$, and $w_C$ of polymer A, B, and C for the polyethylene composition prepared in Example 1.

TABLE 1

|  | Example No. 1 |
|---|---|
| $W_A$ [% by weight] | 46 |
| $W_B$ [% by weight] | 32 |
| $W_C$ [% by weight] | 22 |
| $VN_1$ [cm$^3$/g] | 75 |
| $VN_2$ [cm$^3$/g] | 188 |
| $VN_{tot}$ [cm$^3$/g] | 317 |
| density [g/cm$^3$] | 0.957 |
| $MFI_{190/5}$ [dg/min] | 0.95 |
| SR [%] | 142 |
| FNCT [h] | 10 |
| $NIS_{ISO}$ [kJ/m$^2$] | 12.3 |

The abbreviations for physical properties in Table 1 have the following meanings:

SR (=swell ratio) in [%] measured in a high-pressure capillary rheometer at a shear rate of 1440 s$^{-1}$, in a 2/2 round-section die with conical inlet (angle=15°) at 190° C.

FNCT=stress-crack resistance (Full Notch Creep Test) tested using the internal test method of M. Fleiβner, in [h].

$NIS_{ISO}$=notched impact strength measured as described in ISO 179-1/1 eA/DIN 53453 in [kJ/m$^2$] at 23° C.

EXAMPLE 2

The preparation of the polymer composition was performed in the same manner as described in Example 1, however, with the difference that the Ziegler catalyst fed into the first reactor was in an amount of 14 mmol/h, related to the titanium compound instead of 13.5 mmol/h as in Example 1, together with 180 mmol/h of triethylaluminum.

The amount of ethylene (=72.8 kg/h) and the amount of hydrogen (=68 g/h) were adjusted so that the percentage proportion of ethylene and of hydrogen measured in the gas space of the first reactor were from 21 to 23% by volume and 67% by volume, respectively, and the rest was a mix of nitrogen and vaporized diluent.

The polymerization in the first reactor was carried out at 85° C.

The slurry from the first reactor was then transferred into a second reactor, in which the percentage proportion of hydrogen in the gas phase had been reduced between 6 to 8% by volume, and an amount of 45 g/h of 1-butene was added to this reactor alongside with 30.8 kg/h of ethylene. The amount of hydrogen was reduced by way of intermediate $H_2$ depressurization. 79% by volume of ethylene, 6 to 7% by volume of hydrogen, and 0.7% by volume of 1-butene were measured in the gas phase of the second reactor, the rest being a mix of nitrogen and vaporized diluent.

The polymerization in the second reactor was carried out at 82° C.

The slurry from the second reactor was transferred to the third reactor using further intermediate $H_2$ depressurization to adjust the amount of hydrogen to 2.8% by volume in the gas space of the third reactor.

An amount of 270 g/h of 1-butene was added to the third reactor alongside with an amount of 36.4 kg/h of ethylene. A percentage proportion of 84% by volume of ethylene, 2.8% by volume of hydrogen, and 0.9% by volume of 1-butene was measured in the gas phase of the third reactor, the rest being a mix of nitrogen and vaporized diluent.

The polymerization in the third reactor was carried out at 85° C.

The polymer leaving the third reactor is then dried, pelletized and stabilized under the same conditions as defined in example 1.

Table 2 as shown below gives more details for the polyethylene composition prepared in example 2:

TABLE 2

| | Example No. 2 |
|---|---|
| $W_A$ [% by weight] | 52 |
| $W_B$ [% by weight] | 22 |
| $W_C$ [% by weight] | 26 |
| $VN_1$ [cm³/g] | 85 |
| $VN_2$ [cm³/g] | 194 |
| $VN_{tot}$ [cm³/g] | 305 |
| density [g/cm³] | 0.958 |
| $MFI_{190/5}$ [dg/min] | 1.0 |
| SR [%] | 118 |
| FNCT [h] | 10 |
| $NIS_{ISO}$ [kJ/m²] | 14 |

The abbreviations in Table 2 have the same meanings as those in example 1.

We claim:

1. A polyethylene composition with trimodal molecular mass distribution, which comprises:
   a density in the range from 0.955 to 0.960 g/cm³ at 23° C.;
   an $MFI_{190/5}$ in the range from 0.8 to 1.6 dg/min;
   from 45 to 55% by weight of a low-molecular-mass ethylene homopolymer A having a viscosity $VN_A$ in the range from 70 to 90 cm³/g;
   from 20 to 35% by weight of a high-molecular-mass copolymer B made from ethylene and a 1-olefin comonomer having from 4 to 8 carbon atoms, wherein a mixture of homopolymer A and copolymer B has a viscosity number $VN_2$ in the range from 150 to 200 cm³/g; and
   from 20 to 30% by weight of an ultrahigh-molecular-mass ethylene copolymer C containing a 1-olefin comonomer having from 4 to 8 carbon atoms, wherein a mixture of homopolymer A, copolymer B, and copolymer C has a viscosity number $VN_3$ in the range from 260 to 340 cm³/g, and wherein all of the percentage data are based on the total weight of the composition.

2. The polyethylene composition as claimed in claim 1, wherein the 1-olefin comonomer of copolymer B is present in an amount from 0.1 to 0.6% by weight, based on the weight of copolymer B and the 1-olefin comonomer of copolymer C is present in an amount from 0.5 to 2.5% by weight, based on the weight of copolymer C.

3. The polyethylene composition as claimed in claim 1 wherein the 1-olefin comonomer of copolymer B and the 1-olefin comonomer of copolymer C are independently selected from 1-butene, 1-pentene, 1-hexene, 1-octene, 4-methyl-1-pentene, or a mixture of these.

4. The polyethylene composition as claimed in claim 1, having a viscosity number $VN_{tot}$ of from 280 to 350 cm³/g measured by ISO/R 1191 in decalin at 135° C.

5. The polyethylene composition as claimed in claim 1, which has a swell ratio in the range from 115 to 145%, a notched impact strength (ISO) in the range from 8 to 14 kJ/m², and a stress-crack resistance (FNCT) in the range from 8 to 20 h.

6. A process for producing a polyethylene composition with trimodal molecular mass distribution, having comprising a density in the range from 0.955 to 0.960 g/cm³ at 23° C.; an $MFI_{190/5}$ in the range from 0.8 to 1.6 dg/min; from 45 to 55% by weight of a low-molecular-mass ethylene homopolymer A having a viscosity $VN_A$ in the range from 70 to 90 cm³/g; from 20 to 35% by weight of a high-molecular-mass copolymer B made from ethylene and a 1-olefin comonomer having from 4 to 8 carbon atoms wherein a mixture of homopolymer A and copolymer B has a viscosity number $V_N$, in the range from 150 to 200 cm³/g; and from 20 to 30% by weight of an ultrahigh-molecular-mass ethylene copolymer C containing a 1-olefin comonomer having from 4 to 8 carbon atoms, wherein a mixture of homopolymer A, copolymer B, and copolymer C has a viscosity number $VN_3$ in the range from 260 to 340 cm³/g, wherein all of the percentage data are based on the total weight of the composition, and wherein the monomers are polymerized in slurry in a temperature range of from 20 to 120° C. at a pressure in the range of from 0.15 to 1 MPa, and in the presence of a high-mileage Ziegler catalyst composed of a transition metal compound and of an organoaluminum compound, the process comprising conducting polymerization in three stages, wherein the molecular mass of the polyethylene prepared in each stage is regulated with the aid of hydrogen, thereby forming a hydrogen concentration in each stage.

7. A process for producing a blow molding from a polyethylene composition with trimodal molecular mass distribution, comprising a density in the range from 0.955 to 0.960 g/cm³ at 23° C.; an $MFI_{190/5}$ in the range from 0.8 to 1.6 dg/min; from 45 to 55% by weight of a low-molecular-mass ethylene homopolymer A having a viscosity $VN_A$ in the range from 70 to 90 cm³/g; from 20 to 35% by weight of a high-molecular-mass copolymer B made from ethylene and a 1-olefin comonomer having from 4 to 8 carbon atoms wherein a mixture of homopolymer A and copolymer B has a viscosity number $V_N$, in the range from 150 to 200 cm³/g; and from 20 to 30% by weight of an ultrahigh-molecular-mass ethylene copolymer C containing a 1-olefin comonomer having from 4 to 8 carbon atoms, wherein a mixture of homopolymer A, copolymer B, and copolymer C has a viscosity number $VN_3$ in the range from 260 to 340 cm$^3$/g, wherein all of the percentage data are based on the total weight of the composition, the process comprising:

(a) plasticizing the polyethylene composition in an extruder in a temperature range of from 200 to 250° C.;
(b) extruding the product of step (a) through a die into a mold;
(c) blowing up the product of step (b) in a blow molding apparatus; and
(d) cooling the product of step (c) to solidify the blow molding.

8. The polyethylene composition as claimed in 4 where the viscosity number $VN_{tot}$ is from 300 to 320 cm$^3$/g.

9. The process as claimed in claim 6, wherein the viscosity number $VN_3$ of the mixture of polymer A, polymer B, and polymer C is in the range of from 280 to 320 cm$^3$/g.

10. The process as claimed in claim 7 where the blow molding is a container with a capacity in the range from 200 to 5000 cm$^3$.

* * * * *